(12) United States Patent
Yang

(10) Patent No.: US 9,535,261 B2
(45) Date of Patent: *Jan. 3, 2017

(54) EYEGLASS TEMPLE HAVING AN AUXILIARY CUSHION FRAME

(71) Applicant: GATEWAY SAFETY, INC., Cleveland, OH (US)

(72) Inventor: Shun-Tien Yang, Tainan (TW)

(73) Assignee: Gateway Safety, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,952

(22) Filed: Dec. 29, 2014

(65) Prior Publication Data

US 2015/0185499 A1 Jul. 2, 2015

Related U.S. Application Data

(63) Continuation of application No. 13/314,620, filed on Dec. 8, 2011, now Pat. No. 8,919,952.

(30) Foreign Application Priority Data

Dec. 30, 2010 (TW) ............................. 99225575 U

(51) Int. Cl.
*G02C 5/14* (2006.01)
(52) U.S. Cl.
CPC ................. *G02C 5/14* (2013.01); *G02C 5/143* (2013.01)

(58) Field of Classification Search
CPC ........... G02C 5/14; G02C 5/143; G02C 11/00; G02C 3/003; G02C 5/20; G02C 5/2263; G02C 5/2209; A61F 9/045
USPC ............ 359/43, 62, 119, 120, 142, 130, 158
See application file for complete search history.

(56) References Cited

U.S. PATENT DOCUMENTS

| RE36,762 E | 7/2000 | Canavan et al. |
| 6,278,788 B1 * | 8/2001 | Landis .................... A61F 9/045 16/228 |
| 6,565,208 B1 * | 5/2003 | Lee ........................ G02C 11/00 351/122 |

\* cited by examiner

*Primary Examiner* — Scott J Sugarman
*Assistant Examiner* — Mustak Choudhury
(74) *Attorney, Agent, or Firm* — Fay Sharpe LLP

(57) ABSTRACT

An eyeglass temple includes a main frame adapted for connection with a lens unit, and an auxiliary cushion frame disposed behind the main frame. The auxiliary cushion frame includes an ear engaging portion, a main connecting portion extending forwardly from the ear engaging portion to connect with the main connecting portion, an abutment portion extending forwardly from the ear engaging portion and adapted to be disposed between the main connecting portion and the wearer's head, and at least one resilient connecting portion connected between the main connecting portion and the abutment portion and adapted for biasing the abutment portion away from the main connecting portion toward the wearer's head.

20 Claims, 4 Drawing Sheets

EYEGLASS TEMPLE HAVING AN AUXILIARY CUSHION FRAME

CROSS-REFERENCE TO RELATED APPLICATION

This application is a continuation of U.S. application Ser. No. 13/314,620, filed on Dec. 8, 2011, now U.S. Pat. No. 8,919,952, which claims the benefit of priority from Taiwanese Patent Application No. 099225575 filed on Dec. 30, 2010, the subject matter of which is hereby incorporated herein by reference in its entirety

BACKGROUND OF THE INVENTION

1. Field of the Invention

This invention relates to an eyeglass temple, and more particularly to an eyeglass temple having an auxiliary cushion frame.

2. Description of the Related Art

A pair of conventional eyeglasses typically includes a lens unit and two temples connected respectively to left and right sides of the lens unit and flanking the wearer's head. In case that the head clamping force of the temples is too small, the eyeglasses cannot be worn stably on the wearer's head. Conversely, in case that the head clamping force of the temples is too large, discomfort will be caused to the wearer's head.

SUMMARY OF THE INVENTION

The object of this invention is to provide an eyeglass temple that can facilitate the eyeglasses to be worn stably and comfortably on the wearer's head.

According to this invention, an eyeglass temple includes a main frame adapted for connection with a lens unit, and an auxiliary cushion frame disposed behind the main frame. The auxiliary cushion frame includes an ear engaging portion, a main connecting portion extending forwardly from the ear engaging portion to connect with the main connecting portion, an abutment portion extending forwardly from the ear engaging portion and adapted to be disposed between the main connecting portion and a wearer's head, and at least one resilient connecting portion connected between the main connecting portion and the abutment portion and adapted for biasing the abutment portion away from the main connecting portion toward the wearer's head.

As such, since the abutment portion is biased by the resilient connecting portion to contact the wearer's head, the eyeglasses can be worn stably and comfortably on the wearer's head.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
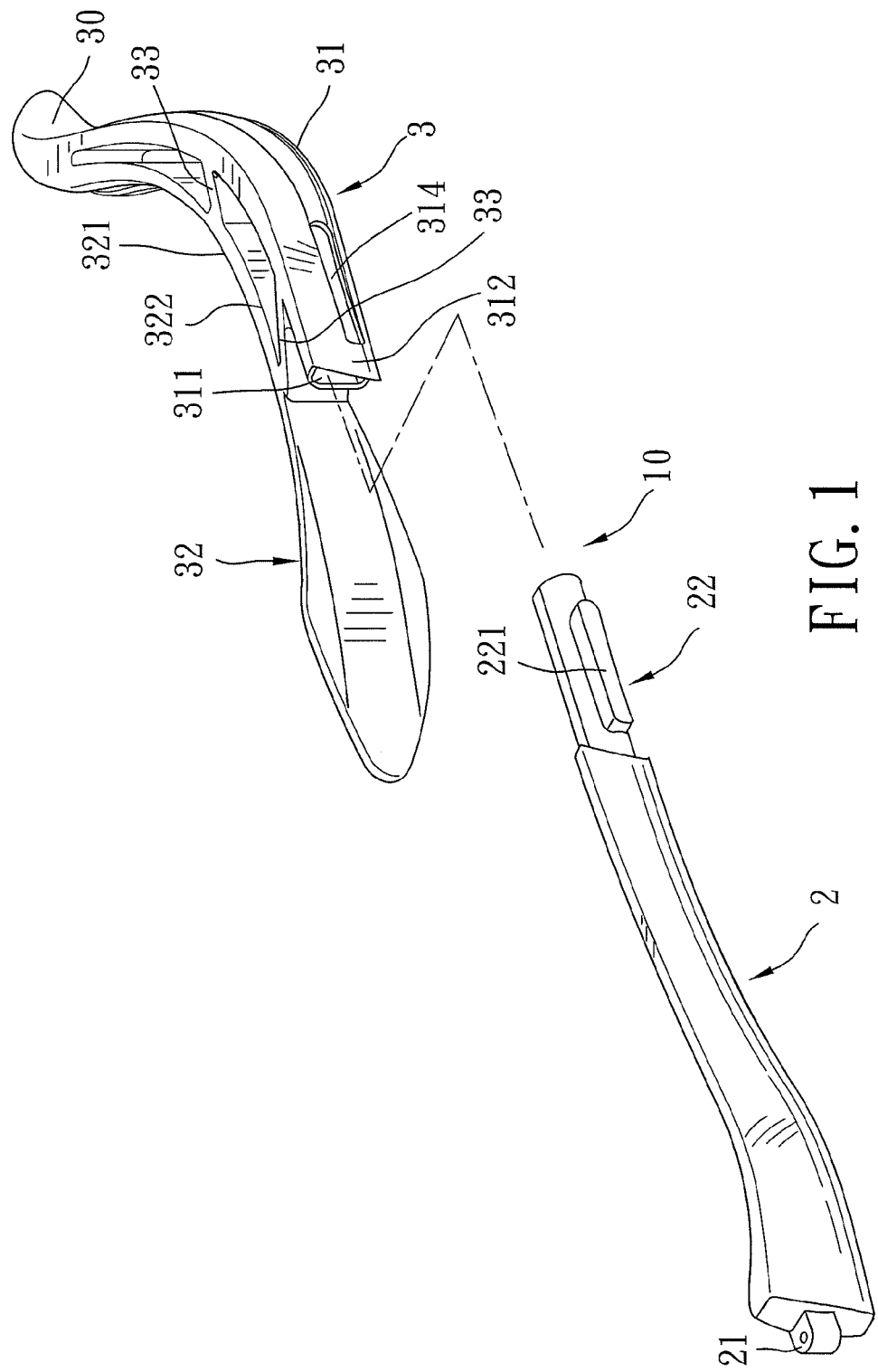
FIG. 1 is an exploded perspective view of the preferred embodiment of an eyeglass temple according to this invention.
Figure 2:
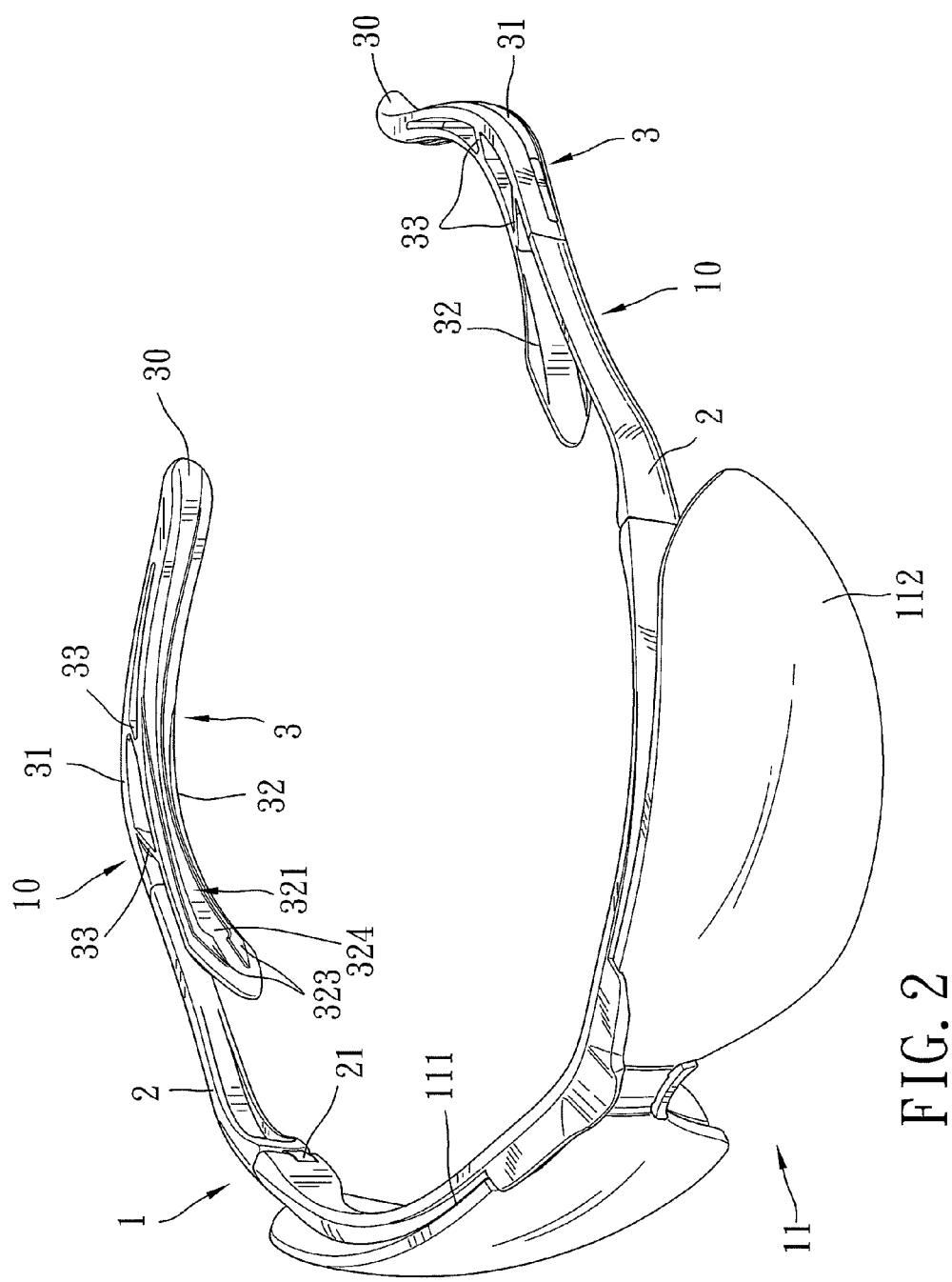
FIG. 2 is a perspective view of a pair of eyeglasses including the preferred embodiment.
Figure 3:
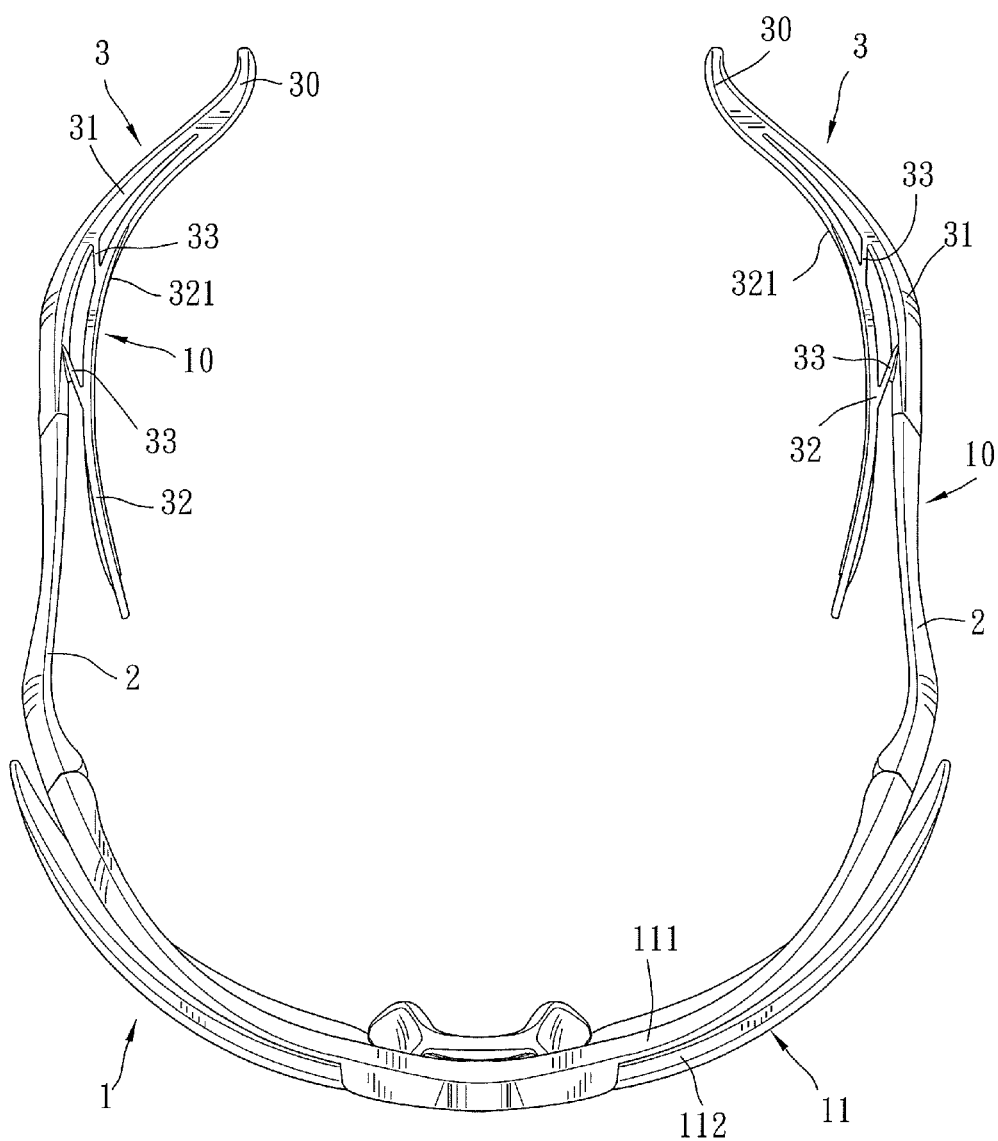
FIG. 3 is a top view of the eyeglasses.

Referring to FIGS. 1, 2, and 3, the preferred embodiment of an eyeglass temple 10 according to this invention forms a portion of a pair of eyeglasses 1. In this embodiment, a lens unit 11 of the eyeglasses 1 has a half frame construction, and includes a frame 111 and two lenses 112 mounted fixedly to the frame 111. The temple 10 is connected pivotally to the frame 111. In practice, the lens unit 11 may have a rimless or full frame construction.

Figure 4:
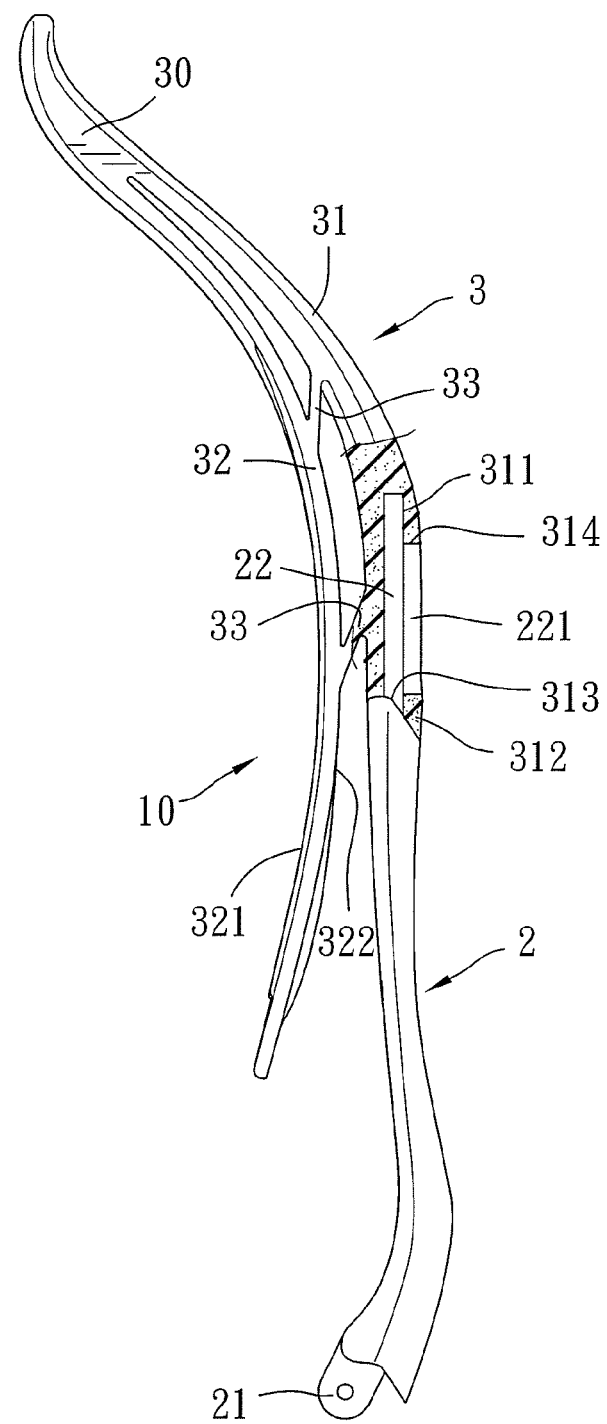
FIG. 4 is a sectional view of the preferred embodiment.

With additional reference to FIG. 4, the temple 10 includes a main frame 2 and an auxiliary cushion frame 3 sleeved on and disposed behind the main frame 2. The main frame 2 includes a pivotal connection portion 21 disposed at a front end thereof and connected pivotally to the frame 111, and an engagement portion 22 disposed at a rear end portion thereof. The engagement portion 22 has an engaging protrusion 221 extending from an outer side thereof.

The auxiliary cushion frame 3 is made of a soft material, such as rubber, silicone, etc., and includes an ear engaging portion 30 disposed at a rear end thereof (i.e., an end thereof distal from the lens unit 11), a main connecting portion 31 extending forwardly from the ear engaging portion 30 to connect with the engagement portion 22 of the main frame 2, an abutment portion 32 extending forwardly from the ear engaging portion 30 and adapted to be disposed between the main connecting portion 31 and the wearer's head, and two resilient connecting portions 33 connected resiliently between the main connecting portion 31 and the abutment portion 32 for biasing the abutment portion 32 away from the main connecting portion 31 toward the wearer's head. The main connecting portion 31 has a loop-shaped wall 312 that defines an insert groove 311 and that permits insertion of the engagement portion 22 of the main frame 2 thereinto. The loop-shaped wall 312 has an engaging hole 314 in spatial communication with the insert groove 311 for engaging the engaging protrusion 221 of the main frame 2. As such, the engagement portion 22 of the main frame 2 is snapped into the main connecting portion 31 of the auxiliary cushion frame 3. Alternatively, the engagement portion 22 may be connected integrally to the main connecting portion 31.

The abutment portion 32 has a curved inner side surface 321 facing the wearer's head, and an outer side surface 322 facing and spaced apart from the main connecting portion 31. The inner side surface 321 is formed with two ribs 323 that extend respectively along top and bottom sides thereof and that define cooperatively a concaved surface area 324 therebetween. Each of the resilient connecting portions 33 is configured as a strip, and extends rearwardly and outwardly from the abutment portion 32 to connect with the main connecting portion 31. If necessary, the number of the resilient connecting portions 33 may be changed according to practice demand to allow the abutment portion 32 to be pressed resiliently against the wearer's head.

When assembly of the main frame 2 and the auxiliary cushion frame 3 is desired, it is only necessary to insert the engagement portion 22 of the main frame 2 into the insert groove 311 of the auxiliary cushion frame 3 until the engaging protrusion 221 of the engagement portion 22 is engaged within the engaging hole 314 in the auxiliary cushion frame 3.

Since the abutment portion 32 of the auxiliary cushion frame 3 is biased to press resiliently against the wearer's head, the eyeglasses 20 can be worn stably and comfortably on the wearer's head. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. An eyewear assembly comprising:
a frame having a frame width extending between opposing first and second frame sides and defining a widthwise direction extending from frame side-to-frame side, said frame including a first pivotal connection point disposed on said frame along said first frame side and a second pivotal connection point disposed on said frame along said second frame side;
at least one lens supported on said frame, said at least one lens having a lens height extending in a heightwise direction that is transverse to said widthwise direction; and,
first and second temple assemblies each pivotally supported at a different one of said first and second pivotal connection points on said frame and in spaced relation to one another in said widthwise direction, said first and second temple assemblies having a temple length and defining a lengthwise direction extending along said length of said first and second temple assemblies, said first and second temple assemblies pivotally displaceable into at least a first position in which said first and second temples extend in a lengthwise direction transverse to said widthwise and said heightwise directions, said first and second temple assemblies including:
a temple frame extending in said lengthwise direction between a pivotal connection portion disposed along a first end of said temple frame and an engagement portion disposed along a second end of said temple frame that is spaced in said lengthwise direction relative to said first end of said temple frame; and,
an auxiliary cushion supported on said engagement portion of said temple frame, said auxiliary cushion including:
a main connecting portion operatively connected to said engagement portion of said temple frame and extending from along said engagement portion in said lengthwise direction away from said pivotal connection portion of said temple frame; and,
an abutment portion extending along said main connecting portion in said lengthwise direction to a cantilevered free end, said cantilevered free end of said abutment portion disposed in spaced relation to at least one of said main connecting portion and said temple frame in said widthwise direction such that said cantilevered free end extends unsupported along said at least one of said main connecting portion and said temple frame.

2. An eyewear assembly according to claim 1, wherein said abutment portion is spaced inward in said widthwise direction relative to said main connecting portion.

3. An eyewear assembly according to claim 2, wherein said main connecting portion includes a first surface facing inward in said widthwise direction and said abutment portion includes a first surface facing outward in said widthwise direction and in facing relation to said first surface of said main connecting portion such that a gap is formed therebetween.

4. An eyewear assembly according to claim 3, wherein said auxiliary cushion includes a resilient connecting portion extending between and operatively connecting said first surface of said main connecting portion and said first surface of said abutment portion.

5. An eyewear assembly according to claim 4, wherein said resilient connecting portion extends outward from along said abutment portion and in said lengthwise direction toward a distal end of said auxiliary cushion.

6. An eyewear assembly according to claim 4, wherein said auxiliary cushion includes a plurality of resilient connecting portions disposed in spaced relation to one another in said lengthwise direction, said plurality of resilient connecting portions extending between and operatively connecting said first surface of said main connecting portion and said first surface of said abutment portion.

7. An eyewear assembly according to claim 1, wherein said auxiliary cushion includes a passage extending into said main connecting portion in lengthwise direction, said passage receiving at least a portion of said engagement portion of said temple frame.

8. An eyewear assembly according to claim 7, wherein said auxiliary cushion includes an engaging hole extending through said main connecting portion such that said engaging hole is in communication with said passage of said main connecting portion, said engaging hole extending through said main connecting portion in a direction transverse to said lengthwise direction.

9. An eyewear assembly according to claim 8, wherein said engagement portion of said temple frame includes an engaging protrusion extending in said direction transverse to said lengthwise direction of said engaging hole such that at least a portion of said engaging protrusion can extend into said engaging hole and abuttingly engage said main connecting portion.

10. An eyewear assembly according to claim 1, wherein said cantilevered free end of said abutment portion extends in said lengthwise direction beyond at least one of said main connecting portion and said temple frame.

11. An eyewear assembly comprising:
a frame having a frame width and extending in a widthwise direction between opposing first and second frame sides, said frame including a first pivotal connection point disposed on said frame along said first frame side and a second pivotal connection point disposed on said frame along said second frame side;
at least one lens supported on said frame, said at least one lens having a lens height extending in a heightwise direction that is transverse to said widthwise direction; and,
first and second temple assemblies each pivotally supported at a different one of said first and second pivotal connection points on said frame and in spaced relation to one another in said widthwise direction, said first and second temple assemblies having a temple length and pivotally displaceable into at least a first position in which said first and second temples extend in a lengthwise direction transverse to said widthwise and said heightwise directions, said first and second temple assemblies including:
a temple frame extending in said lengthwise direction between a pivotal connection portion disposed along a first end of said temple frame and an engagement portion disposed along a second end of said temple frame that is spaced in said lengthwise direction relative to said first end of said temple frame; and, an auxiliary cushion supported on said engagement portion of said temple frame, said auxiliary cushion including:
- a main connecting portion operatively connected to said engagement portion of said temple frame and extending from along said engagement portion in said lengthwise direction away from said pivotal connection portion of said temple frame;
- an abutment portion extending along said main connecting portion in said lengthwise direction, said abutment portion spaced inwardly from said main connecting portion in said widthwise direction; and,
- at least two resilient connecting portions extending between and operatively connecting said main connecting portion and said abutment portion, said at least two resilient connecting portions biasing said abutment portion away from said main connecting portion in a widthwise direction, and said at least two resilient connecting portions disposed in spaced relation to one another in said lengthwise direction and defining at least one cavity between said main connecting portion and said abutment portion, said at least one cavity extending through said auxiliary cushion in said heightwise direction.

12. An eyewear assembly according to claim 11, wherein said abutment portion extends in said lengthwise direction to a cantilevered free end and extending unsupported along at least a portion of said temple frame in a direction toward said pivotal connection portion.

13. An eyewear assembly according to claim 11, wherein said at least two resilient connecting portions extend at an angle from said abutment portion in a lengthwise and outward direction to connect with said main connecting portion.

14. An eyewear assembly according to claim 11, wherein said abutment portion includes a first surface facing inward in said widthwise direction away from said main connecting portion, and said abutment portion includes at least one elongated rib extending in said lengthwise direction along said first surface.

15. An eyewear assembly according to claim 14, wherein said at least one elongated rib includes at least two ribs disposed in spaced relation to one another that cooperatively define a concave area along said first surface of said abutment portion.

16. An eyeglass temple adapted for connection with an associated lens unit, said eyeglass temple comprising:
- an end connection dimensioned for securement to the associated lens unit and operable for pivotal displacement in a left-and-right direction relative to the associated lens unit;
- a first temple portion disposed in spaced relation to said end connection and including a first surface facing in said left-and-right direction;
- a second temple portion disposed in offset relation in the left-and-right direction to at least said first temple portion, said second temple portion including a second surface disposed in facing relation to said first surface of said first temple portion such that a gap is at least partially defined therebetween with said second temple portion dimensioned to be disposed between said first temple portion and an associated wearer's head in said left-and-right direction;
- a third temple portion that extends unsupported from along said second temple portion to a cantilevered free end; and,
- at least one resilient connecting portion operatively connecting said first and second temple portions, said at least one resilient connecting portion adapted for biasing said second temple portion away from said first temple portion to contact the wearer's head in the left-to-right direction.

17. An eyeglass temple according to claim 16 further comprising a fourth temple portion extending between and operatively connecting said first and second temple portions.

18. An eyeglass temple according to claim 17, wherein said end connection is disposed along a first end of said eyeglass temple, and said fourth temple portion is disposed along a second end of said eyeglass temple that is opposite said first end.

19. An eyeglass temple according to claim 17, wherein said at least one resilient connecting portion includes at least two resilient connecting portions disposed in spaced relation to one another such that at least two cavities is formed thereby between said first, second and fourth temple portions.

20. An eyeglass temple according to claim 16 further comprising a temple frame and an auxiliary cushion;
- said temple frame including a first end and an opposing second end with said end connection for securement of said temple frame to the associated lens unit disposed along said first end and an engagement portion disposed along said second end of said temple frame;
- said auxiliary cushion supported on said engagement portion of said temple frame and including said first temple portion, said second temple portion and said at least one resilient connecting portion with said first temple portion operatively connected to said engagement portion of said temple frame.

* * * * *